(12) United States Patent
Duan et al.

(10) Patent No.: US 10,974,593 B2
(45) Date of Patent: Apr. 13, 2021

(54) POWERTRAIN FOR AN ELECTRIC VEHICLE

(71) Applicant: GM Global Technology Operations LLC, Detroit, MI (US)

(72) Inventors: Chengwu Duan, Shanghai (CN); Jian Yao, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 58 days.

(21) Appl. No.: 16/405,455

(22) Filed: May 7, 2019

(65) Prior Publication Data
US 2020/0070651 A1    Mar. 5, 2020

(30) Foreign Application Priority Data

Aug. 31, 2018 (CN) .......................... 201811008198.2

(51) Int. Cl.
| | |
|---|---|
| *B60K 17/12* | (2006.01) |
| *B60W 20/13* | (2016.01) |
| *B60K 6/38* | (2007.10) |
| *B60K 6/365* | (2007.10) |
| *B60W 20/30* | (2016.01) |

(52) U.S. Cl.
CPC .............. *B60K 17/12* (2013.01); *B60K 6/365* (2013.01); *B60K 6/38* (2013.01); *B60W 20/13* (2016.01); *B60W 20/30* (2013.01)

(58) Field of Classification Search
CPC ......... B60W 20/13; B60W 20/30; B60K 6/38; B60K 6/365; B60K 17/12
USPC .......................................................... 475/207
See application file for complete search history.

(56) References Cited

U.S. PATENT DOCUMENTS

| | | | |
|---|---|---|---|
| 7,070,534 B2* | 7/2006 | Pelouch | F16H 37/046 475/207 |
| 7,470,206 B2* | 12/2008 | Rodgers, II | F16H 37/042 475/218 |
| 7,604,561 B2* | 10/2009 | Earhart | F16H 37/04 475/218 |

\* cited by examiner

*Primary Examiner* — Leslie A Nicholson, III

(57) ABSTRACT

A powertrain for a vehicle includes a housing, a motor generator unit, a torque converter, a first and second shafts, a first and second gear sets, and a torque transmitting mechanism. The motor generator unit includes an output member. The torque converter includes a pump and a turbine. The pump is connected for common rotation with the output member of the motor generator unit. The first shaft rotatably is supported by the powertrain housing and is connected for common rotation with the turbine of the torque converter. The second shaft is rotatably supported by the powertrain housing and disposed parallel to the first shaft. An output gear is connected for common rotation to the second shaft.

16 Claims, 3 Drawing Sheets

POWERTRAIN FOR AN ELECTRIC VEHICLE

CROSS-REFERENCE TO RELATED APPLICATION

This application claims priority to the Chinese Application No. 201811008198.2 filed on Aug. 31, 2018. The disclosure of which is incorporated herein by reference in its entirety.

INTRODUCTION

The present disclosure relates generally to vehicle powertrains and more particularly to transmissions for vehicles having an electric motor generator unit as the primary source of torque.

Modern electric vehicles (EV) have been gaining in popularity do to advancements in many vehicle performance attributes. However, major roadblock in the increased popularity of EVs includes the range that an EV can travel on a single charge. While there are many characteristics that contribute to extending the range of EVs, improving some characteristics can be detrimental to the performance of the EV in other areas. These tradeoffs are sometimes negotiated as being to satisfy customer expectations. For example, when a driver is operating a sport car with a powerful engine they understand that the engine may be loud when running at top speed. Additionally, if the driver wants to get through a corner quickly they accept they possibility that they may feel holes and bumps in the road more than if they were driving a comfortable cruising vehicle.

Therefore, while prioritizing to extend the range of an EV other attributes suffer. For example, resizing the motor generator unit (MGU) may provide opportunities to use less battery energy to travel the same distance. However, other attributes such as drivability, launch performance, and maneuverability may not meet customer expectations.

Accordingly, there is a need in the art for improved EVs having superior performance while surpassing the current range capabilities and improving affordability through cost reduction.

SUMMARY

The present disclosure comprises a powertrain for a vehicle. The powertrain includes a housing, a motor generator unit, a torque converter, a first and second shafts, a first and second gear sets, and a torque transmitting mechanism. The motor generator unit includes an output member. The torque converter includes a pump and a turbine. The pump is connected for common rotation with the output member of the motor generator unit. The first shaft rotatably is supported by the powertrain housing and is connected for common rotation with the turbine of the torque converter. The second shaft is rotatably supported by the powertrain housing and disposed parallel to the first shaft. An output gear is connected for common rotation to the second shaft.

The first gear set includes a first gear and a second gear with the first gear rotatably supported by the first shaft and the second gear is connected for common rotation with the second shaft. The second gear set has a third gear and a fourth gear with the third gear rotatably supported by the first shaft and the fourth gear connected for common rotation with the second shaft. The torque transmitting mechanism selectively transfers torque from the first shaft to the second shaft. The powertrain is selectively actuated to provide one of a first forward drive gear ratio and a reverse drive gear ratio.

In one example of the present disclosure, the torque transmitting mechanism selectively connects for common rotation the first gear of the first gear set to the first shaft.

In another example of the present disclosure, the torque transmitting mechanism selectively connects for common rotation the third gear of the second gear set to the first shaft.

In yet another example of the present disclosure, a transfer member is disposed around the first gear and second gear of the first gear set for transferring torque from the first gear to the second gear.

In yet another example of the present disclosure, the transfer member is one of a chain and a belt.

In yet another example of the present disclosure, the torque transmitting mechanism is one of a synchronizer and a dog clutch.

In yet another example of the present disclosure, the first gear set further includes a planetary gear set comprising a sun gear, a ring gear, a plurality of planet gears meshing with each of the sun gear and ring gear. A planet gear carrier member rotatably supporting the planet gears. The sun gear is connected for common rotation to the pump of the torque converter and the planet gear carrier member is connected for common rotation with the first gear of the first gear set.

In yet another example of the present disclosure, the torque transmitting mechanism selectively connects the ring gear of the planetary gear set to the housing.

In yet another example of the present disclosure, the third gear of the second gear set is coplanar with the fourth gear of the second gear set and the third gear is connected for common rotation with the first shaft.

In yet another example of the present disclosure, the torque transmitting mechanism is a dog clutch.

In yet another example of the present disclosure, the powertrain is selectively actuated to provide an initial forward launch mode, a secondary forward launch mode, and a reverse launch mode. The initial forward launch mode includes engaging the dog clutch while the motor generator unit is operating in a forward rotation direction. The secondary forward launch mode includes disengaging the dog clutch while the motor generator unit is operating in the forward rotation direction. The reverse launch mode includes engaging the dog clutch while the motor generator unit is operating in the reverse rotation direction.

The above features and advantages and other features and advantages of the present disclosure are readily apparent from the following detailed description when taken in connection with the accompanying drawings.

BRIEF DESCRIPTION OF THE DRAWINGS

The drawings described herein are for illustration purposes only and are not intended to limit the scope of the present disclosure in any way.

DESCRIPTION

Figure 1:
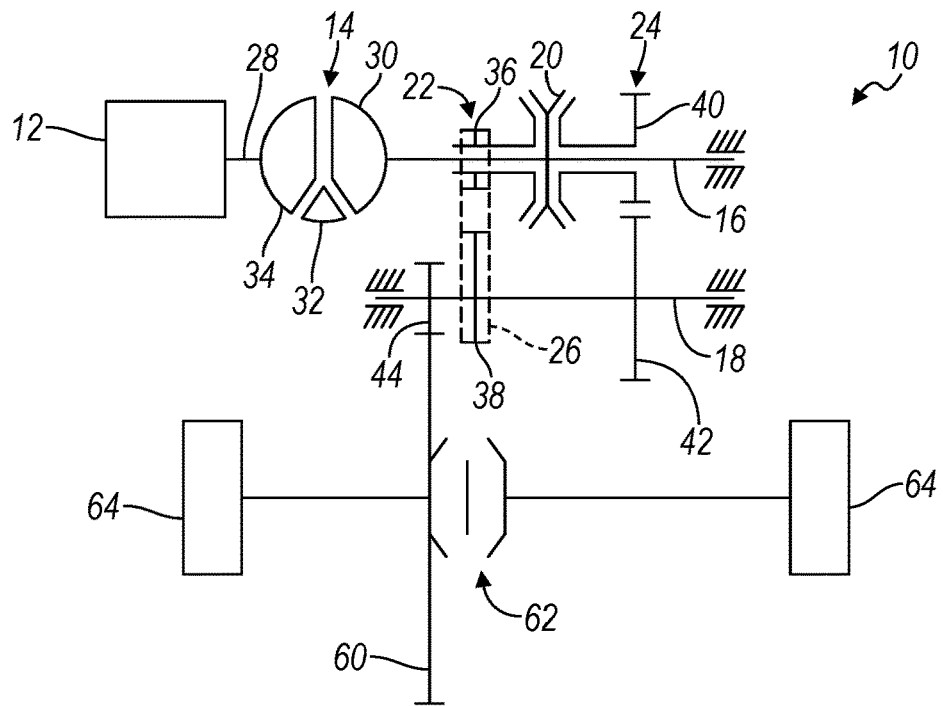
FIG. 1 is a schematic of a powertrain of an electric vehicle according to the principles of the present disclosure.

Referring to the drawings, wherein like reference numbers refer to like components, in FIGS. 1 and 2, examples of a powertrain for a vehicle are illustrated and will now be described. The powertrain of FIG. 1, given the designation of reference number 10, includes a motor generator unit (MGU) 12, a torque converter 14, a first shaft 16, a second shaft 18, a synchronizer 20, a first coplanar gear set 22, a second coplanar gear set 24, and a transfer member 26. More specifically, the MGU 12 is an electric motor that provides torque to an output shaft 28 by converting stored electrical power to rotational mechanical torque. However, other types of motors or engines may be considered for the powertrain 10 without departing from the present disclosure. For example, an internal combustion engine may be employed to provide torque to the remaining powertrain.

The torque converter 14 includes a turbine 30, a stator 32, and a pump 34. The turbine 30 is connected for common rotation with the first shaft 16. The pump 34 is connected for common rotation with the output shaft 28 of the MGU 12. The stator 32 is disposed between the turbine 30 and the pump 34 and provides a mechanism for multiplying the torque from the turbine 30 to the pump 34.

The first and second coplanar gear sets 22, 24 each include two gears. A first gear 36 of the first coplanar gear set 22 is rotatably supported by the first shaft 16. A second gear 38 of the first coplanar gear set 22 is connected for common rotation with the second shaft 18. The transfer member 26 is connected for common rotation with each of the first gear 36 and the second gear 38 of the first coplanar gear set 22. The transfer member 26 may be a chain or a belt or some other apparatus used to maintain the transfer of torque from the first gear 36 to the second gear 38 of the first coplanar gear set 22 while maintaining the same direction of rotation.

A first gear 40 of the second coplanar gear set 24 is also rotatably supported by the first shaft 16. A second gear 42 of the second coplanar gear set 24 is connected for common rotation with the second shaft 18. The first gear 40 and second gear 42 of the second coplanar gear set 24 are disposed into a meshing arrangement with each other. In this manner, the transfer of torque from the first gear 40 to the second gear 42 of the second coplanar gear set 24 occurs with a change in rotational direction between the first gear 40 and the second gear 42.

The second shaft 18 includes an output gear 44 connected for common rotation to the second shaft 18. The output gear 44 meshes with a ring gear 60 of a differential 62 providing a torque pathway to the drive wheels 64 of the vehicle.

The synchronizer 20 includes an inner spline that engages with a spline on the first shaft 16 providing common rotation between the synchronizer 20 and the first shaft 16 while maintaining relative axial movement. Thus, the synchronizer 20 is selectively manipulated to one of three positions by sliding on the first shaft 16. When the synchronizer 20 is disposed in a first or neutral position the first shaft 16 rotates freely relative to the first gears 36, 40 of the first and second coplanar gear sets 22, 24. In a second or forward position, the synchronizer 20 slides along the first shaft 16 to engage for common rotation with the first gear 40 of the second coplanar gear set 24. In this manner, the first gear 40 rotates in common with each of the synchronizer 20 and the first shaft 16.

In a third or reverse position, the synchronizer 20 slides along the first shaft 16 to engage for common rotation with the first gear 36 of the first coplanar gear set 22. Like the second position, the third position provides for common rotation between the first gear 36 of the first coplanar gear set 22 and the first shaft 16. However, since the first gear 36 is coupled to the second gear 38 through the transfer member 26 and not via meshing gears, the second gear 38 and therefore the second shaft 18, output gear 44, and differential 62 rotate in a reverse direction. In this manner, a reverse gear ratio is achieved which maintaining the same rotation direction of the MGU 12. The resulting benefit includes maintaining the torque multiplication of the torque converter 14 while providing a reverse direction on the drive wheels 64.

Figure 2:
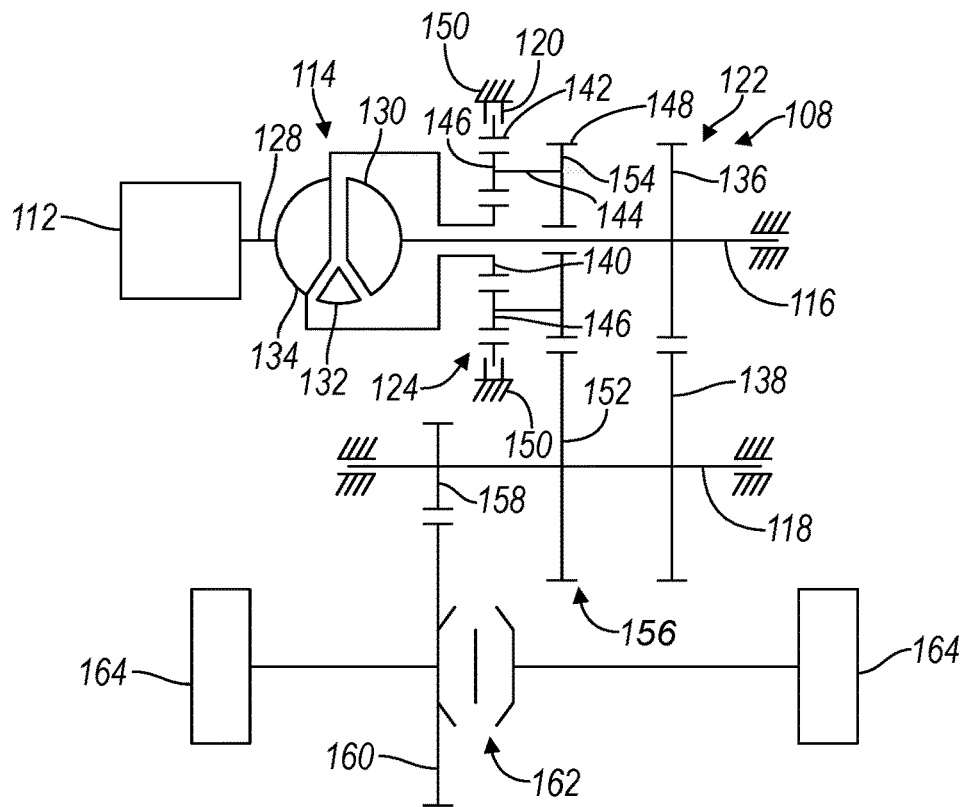
FIG. 2 is a schematic of a powertrain of an electric vehicle according to the principles of the present disclosure.

Turning now to FIG. 2, another example of the present disclosure is illustrated and will now be described. The powertrain of FIG. 2, given the designation of reference number 100, includes a MGU 112, a torque converter 114, a first shaft 116, a second shaft 118, a torque transmitting mechanism 120, a coplanar gear set 122, and a planetary gear set 124. More specifically, the MGU 112 is an electric motor that provides torque to an output member 128 by converting stored electrical power to rotational mechanical torque.

The torque converter 114 includes a turbine 130, a stator 132, and a pump 134. The turbine 130 is connected for common rotation with the first shaft 116. The pump 134 is connected for common rotation with the output member 128 of the MGU 112. The stator 132 is disposed between the turbine 130 and the pump 134 and provides a mechanism for multiplying the torque from the turbine 130 to the pump 134.

The coplanar gear set 122 includes a first gear 136 and a second gear 138. The first gear 136 of the coplanar gear set 122 is connected for common rotation with the first shaft 116. A second gear 138 of the coplanar gear set 122 is connected for common rotation with the second shaft 118.

The planetary gear set 124 includes a sun gear member 140, a ring gear member 142 and a planet gear carrier member 144 that rotatably supports a set of planet gears 146 (only two of which is shown). The planet gears 146 are each configured to intermesh with both the sun gear member 140 and the ring gear member 142. The sun gear member 140 is connected for common rotation to the pump 134 of the torque converter 114. The ring gear member 142 is selectively connected to a housing 150 of the powertrain through the torque transmitting mechanism 120. The type of torque transmitting mechanism 120 employed in the present example is a dog clutch 120 that is selectively operated by a powertrain controller. However, alternative torque transmitting mechanisms may be employed without departing from the scope of the disclosure. For example, the torque transmitting mechanism 120 may be a clutch or brake having interweaved clutch plates that are selectively activated by a powertrain controller through a hydraulic piston. The planet gear carrier member 144 includes a splined outer perimeter 148 that meshes with a second coplanar gear 152 that is connected for common rotation with the second shaft 118. In an alternative manner achieving the same purpose, the planet gear carrier member 144 is connected for common rotation with a first gear 154 of a second coplanar gear set 156. The second coplanar gear set 156 includes a second coplanar gear 152 meshing with the first gear 154 and connected for common rotation with the second shaft 118.

The second shaft 118 includes an output gear 158 connected for common rotation to the second shaft 118. The output gear 158 meshes with a ring or input gear 160 of a differential 162 providing a torque pathway to the drive wheels 164 of the vehicle.

The operation of the powertrain 100 includes three phases or modes of function. In a first or initial forward launch mode, the torque transmitting mechanism 120 is engaged and the powertrain is launching the vehicle in the forward direction. The powerflow, since the pump 134 and the turbine 130 are not hydraulically coupled at launch, flows from the pump 134 through the sun gear member 140 of the planetary gear set 124. Since the ring gear member 142 is held by the torque transmitting mechanism 120, the planet gears 146 rotate relative to the sun gear member 140 and the ring gear member 142. The planet gear carrier member 144 rotates at a reduced speed ratio from the sun gear member 140 and therefor the output member 128 of the MGU 112. The powerflow proceeds through the planet gear carrier member 144 to the coplanar gear 152 of the second shaft 118 and to the output gear 158 and differential 162. The purpose of the first mode is to immediately transfer a low speed, high torque powerflow from the MGU 112 to the drive wheels 164.

A second or secondary forward launch mode includes disengaging the torque transmitting mechanism 120 while continuing to launch the vehicle in the forward direction. As the turbine 130 speed increases and couples with the pump 134 of the torque converter 114, the powerflow path includes the torque converter 114, the first shaft 116, the first gear 136 of the coplanar gear set 122, the second gear 138 of the coplanar gear set 122, and the second shaft 118. Since the powerflow goes through the torque converter, if the torque transmitting mechanism 120 is of a dog clutch type, it will automatically unload and be disengaged. If the torque transmitting mechanism 120 requires additional control, such as a hydraulic brake or clutch, disengagement would require a hydraulic or electric signal to do so.

The third or reverse launch mode includes launching the vehicle in the reverse direction in a lower gear ratio. With the torque transmitting mechanism 120 engaged and braking the ring gear member 142 of the planetary gear set 124, the MGU 112 is powered in the reverse direction and the powerflow includes the pump 134 of the torque converter 114, the sun gear member 140 of the planetary gear set 124, the planet gear carrier member 144 of the planetary gear set 124, the splined outer perimeter 148 of the planet gear carrier member 144, the coplanar gear 152, and the second shaft 118. Since the ring gear member 142 is held, the planet gear carrier member 144 spins at a lower speed than the sun gear member 140 yet carries higher torque.

Figure 3A:
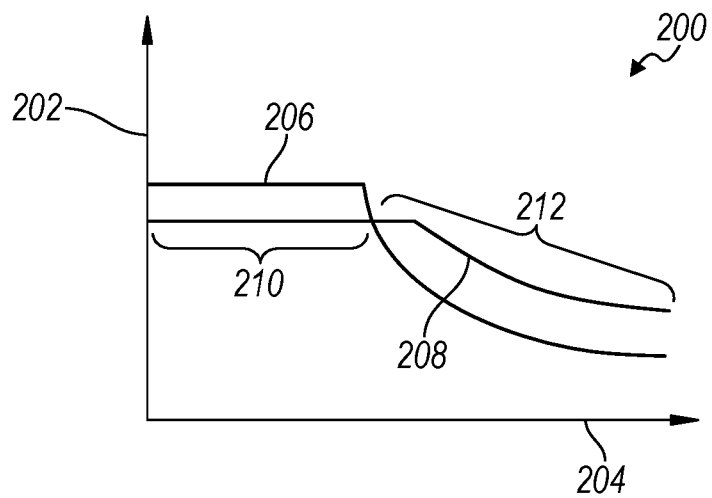
FIGS. 3A and 3B are graphs comparing motor torque to motor speed and the resulting vehicle performance according to the principles of the present disclosure.
Figure 3B:
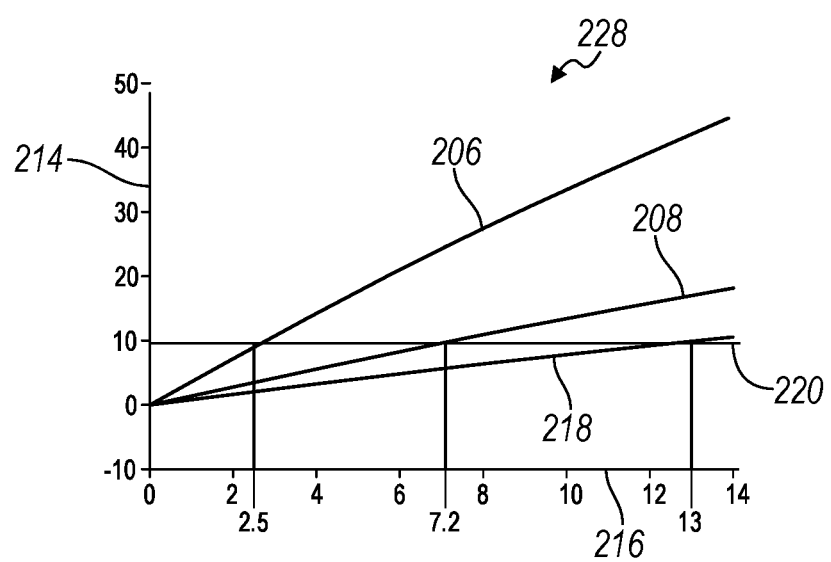

Turning now to FIGS. 3A, 3B, 4, and 5, graphs depicting the performance of a vehicle with the powertrain 100 of the present disclosure are displayed and will now be described. FIG. 3A is a graph 200 showing the amount of torque 202 available at a particular motor speed 204. The data includes baseline MGU 206 and a downsized MGU 208. As can be seen, the baseline MGU 206 has more torque at lower motor speed 210, however, at higher motor speed 212, the downsized MGU 208 has higher torque. Thus while the benefits utilizing the downsized MGU 208 can been realized at higher motor speed 212, the drop-off of performance at lower motor speed 210 requires an additional solution. FIG. 3B is a graph 228 showing the performance of an electric vehicle in a graded reverse maneuver. The y-axis 214 depicts vehicle speed in kph at the launch of a vehicle in reverse up a 25% grade. The x-axis 216 depicts the time in seconds required to reach a particular speed. In the data provided, the baseline MGU 206 requires 2.5 sec to achieve 10 kph 220 while the downsized MGU 208 requires 7.2 sec to achieve 10 kph. A larger reduction in MGU size represented by 218 results in almost double the time 13 sec required to get to 10 kph.

Figure 4:
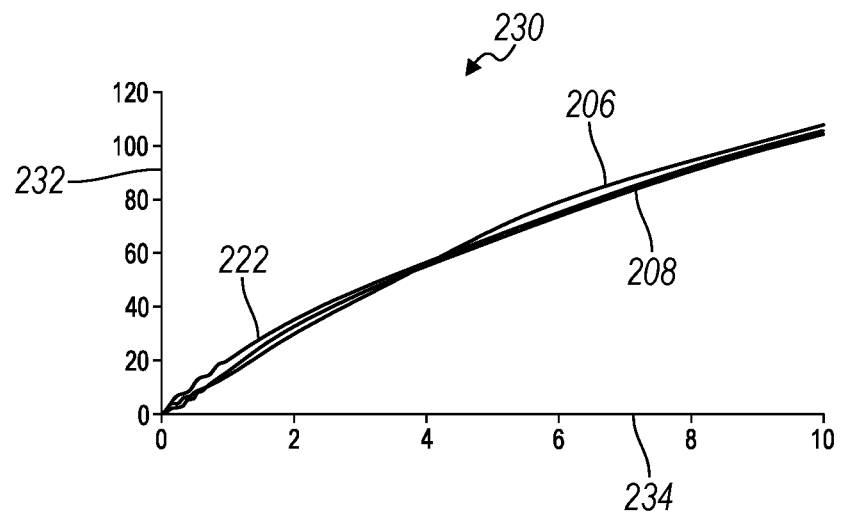
FIG. 4 is a graph of vehicle speed for various examples of powertrains according to the principles of the present disclosure.

The graph 230 shown in FIG. 4 depicts launch performance of three different powertrain configurations. The y-axis 232 is launch speed in kph while the x-axis is the time in seconds 234. As can been seen, the baseline MGU 206 underperforms the other powertrain configurations up to about 4 sec. In particular, a first data includes the performance of the downsized MGU 208 (in this example, 25% smaller motor) and the downsized MGU 222 with the powertrain 100 configured in FIG. 2.

Figure 5:
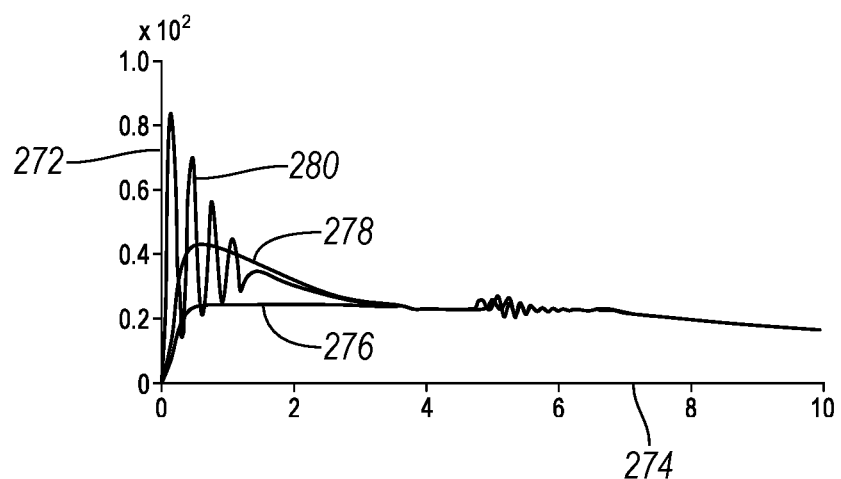
FIG. 5 is a graph of the torque measurements at various components for a powertrain according to the principles of the present disclosure.

A graph 270 shown in FIG. 5 depicts the torque output of the powertrains for three configurations. The y-axis 272 is torque with the x-axis being the time from launch in seconds 274. A second data series 276 is generated by the pump 134 torque of the torque converter 114. A third data series 278 is generated by the turbine 130 torque. A fourth data series 280 is generated by the torque at planetary gear set 124 configured as shown in FIG. 2. As can be shown, the torque multiplication is significantly increased from the pump 134 to the planet gear carrier member 144.

While examples have been described in detail, those familiar with the art to which this disclosure relates will recognize various alternative designs and examples for practicing the disclosed method within the scope of the appended claims.

The following is claimed:

1. A powertrain for a vehicle, the powertrain comprising:
a powertrain housing;
a motor generator unit comprising an output member;
a torque converter comprising a pump and a turbine, and wherein the pump is connected for common rotation with the output member of the motor generator unit;
a first shaft rotatably supported by the powertrain housing, and wherein the first shaft is connected for common rotation with the turbine of the torque converter;
a second shaft rotatably supported by the powertrain housing and disposed parallel to the first shaft, and wherein an output gear is connected for common rotation to the second shaft;
a first gear set comprising a first gear and a second gear, and wherein the first gear is rotatably supported by the first shaft and the second gear is connected for common rotation with the second shaft;
a second gear set comprising a third gear and a fourth gear, and wherein the third gear is rotatably supported by the first shaft and the fourth gear is connected for common rotation with the second shaft, and
a torque transmitting mechanism to selectively transfer torque from the first shaft to the second shaft and wherein the torque transmitting mechanism selectively connects for common rotation the first gear of the first gear set to the first shaft; and
wherein the powertrain is selectively actuated to provide one of a first forward drive gear ratio and a reverse drive gear ratio.

2. The powertrain of claim 1 wherein the torque transmitting mechanism is one of a synchronizer, a dog clutch, and a friction clutch.

3. The powertrain of claim 1 wherein the first gear set further includes a planetary gear set comprising a sun gear, a ring gear, a plurality of planet gears meshing with each of the sun gear and the ring gear, and a planet gear carrier member rotatably supporting the planet gears, and wherein the sun gear is connected for common rotation to the pump of the torque converter and the planet gear carrier member is connected for common rotation with the first gear of the first gear set.

4. The powertrain of claim 3 wherein the torque transmitting mechanism selectively connects the ring gear of the planetary gear set to the housing.

5. The powertrain of claim 4 wherein the third gear of the second gear set is coplanar with the fourth gear of the second gear set and the third gear is connected for common rotation with the first shaft.

6. The powertrain of claim 5 wherein the torque transmitting mechanism is a dog clutch.

7. A powertrain for a vehicle, the powertrain comprising:
a powertrain housing;
a motor generator unit comprising an output member;
a torque converter comprising a pump and a turbine, and wherein the pump is connected for common rotation with the output member of the motor generator unit;
a first shaft rotatably supported by the powertrain housing, and wherein the first shaft is connected for common rotation with the turbine of the torque converter;
a second shaft rotatably supported by the powertrain housing and disposed parallel to the first shaft, and wherein an output gear is connected for common rotation to the second shaft and meshes with an input gear of a differential;
a first gear set comprising a first gear and a second gear, and wherein the first gear is rotatably supported by the first shaft and the second gear is connected for common rotation with the second shaft;
a second gear set comprising a third gear and a fourth gear, and wherein the third gear is rotatably supported by the first shaft and the fourth gear is connected for common rotation with the second shaft, and
torque transmitting mechanism to selectively transfer torque from the first shaft to the second shaft and wherein the torque transmitting mechanism is one of a synchronizer and a dog clutch; and
wherein the powertrain is selectively actuated to provide one of a first forward drive gear ratio and a reverse drive gear ratio.

8. The powertrain of claim 7 wherein the torque transmitting mechanism selectively connects for common rotation one of the first gear of the first gear set and the second gear of the second gear set to the first shaft.

9. The powertrain of claim 8 further comprising one of a chain and a belt disposed around the first gear and the second gear of the first gear set for transferring torque from the first gear to the second gear.

10. The powertrain of claim 7 wherein the first gear set further includes a planetary gear set comprising a sun gear, a ring gear, a plurality of planet gears meshing with each of the sun gear and the ring gear, and a planet gear carrier member rotatably supporting the planet gears, and wherein the sun gear is connected for common rotation to the pump of the torque converter, the planet gear carrier member is connected for common rotation with the first gear of the first gear set, and the torque transmitting mechanism selectively connects the ring gear of the planetary gear set to the housing.

11. The powertrain of claim 10 wherein the third gear of the second gear set is coplanar with the fourth gear of the second gear set and the third gear is connected for common rotation with the first shaft.

12. The powertrain of claim 11 wherein the torque transmitting mechanism is one of a dog clutch, a friction clutch, and a brake.

13. The powertrain of claim 12 wherein the powertrain is selectively actuated to provide an initial forward launch mode, a secondary forward launch mode, and a reverse launch mode.

14. A powertrain for a vehicle, the powertrain comprising:
a powertrain housing;
a motor generator unit comprising an output member;
a torque converter comprising a pump and a turbine, and wherein the pump is connected for common rotation with the output member of the motor generator unit;
a first shaft rotatably supported by the powertrain housing, and wherein the first shaft is connected for common rotation with the turbine of the torque converter;
a second shaft rotatably supported by the powertrain housing and disposed parallel to the first shaft, and wherein an output gear is connected for common rotation to the second shaft and meshes with an input gear of a differential;
a first gear set comprising a first gear, and a second gear, and wherein the first gear is rotatably supported by the first shaft and the second gear is connected for common rotation with the second shaft;
a planetary gear set comprising a sun gear, a ring gear, a plurality of planet gears meshing with each of the sun gear and the ring gear, and a planet gear carrier member rotatably supporting the planet gears, and wherein the sun gear is connected for common rotation to the pump of the torque converter, the planet gear carrier member is connected for common rotation with the first gear of the first gear set;
a second gear set comprising a third gear and a fourth gear, and wherein the third gear is rotatably supported by the first shaft and the fourth gear is connected for common rotation with the second shaft;
a torque transmitting mechanism to selectively transfer torque from the first shaft to the second shaft, and wherein the torque transmitting mechanism is a dog clutch for selectively connecting the ring gear of the planetary gear set to the housing; and
wherein the powertrain is selectively actuated to provide an initial forward launch mode, a secondary forward launch mode, and a reverse launch mode, the initial forward launch mode includes engaging the dog clutch while the motor generator unit is operating in a forward rotation direction, the secondary forward launch mode includes disengaging the dog clutch while the motor generator unit is operating in the forward rotation direction, and the reverse launch mode includes engaging the dog clutch while the motor generator unit is operating in a reverse rotation direction.

15. The powertrain of claim 14 wherein the third gear of the second gear set is coplanar with the fourth gear of the second gear set and the third gear is connected for common rotation with the first shaft.

16. The powertrain of claim 15 wherein the torque converter further comprises a stator disposed between the pump and the turbine for multiplying torque transferring from the pump to the turbine.

* * * * *